(12) United States Patent
Poggioli et al.

(10) Patent No.: US 12,551,047 B2
(45) Date of Patent: Feb. 17, 2026

(54) COFFEE MACHINE

(71) Applicant: DE' LONGHI APPLIANCES S.R.L., Treviso (IT)

(72) Inventors: Massimo Poggioli, Treviso (IT); Francesco Fiorotto, Treviso (IT); Giovanni Rossetto, Treviso (IT)

(73) Assignee: DE' LONGHI APPLIANCES S.r.l., Treviso (IT)

(*) Notice: Subject to any disclaimer, the term of this patent is extended or adjusted under 35 U.S.C. 154(b) by 715 days.

(21) Appl. No.: 17/919,467

(22) PCT Filed: Mar. 26, 2021

(86) PCT No.: PCT/EP2021/057888
§ 371 (c)(1),
(2) Date: Oct. 17, 2022

(87) PCT Pub. No.: WO2021/209247
PCT Pub. Date: Oct. 21, 2021

(65) Prior Publication Data
US 2023/0148787 A1    May 18, 2023

(30) Foreign Application Priority Data

Apr. 16, 2020  (IT) .................. 102020000008128

(51) Int. Cl.
A47J 31/44    (2006.01)

(52) U.S. Cl.
CPC ....... A47J 31/4489 (2013.01); A47J 31/4485 (2013.01)

(58) Field of Classification Search
CPC ................. A47J 31/4485; A47J 31/4489; B01F 2101/07

USPC ...................................... 99/293, 453
See application file for complete search history.

(56) References Cited

U.S. PATENT DOCUMENTS

| 2007/0243305 | A1* | 10/2007 | Marconi ............ | A47J 31/4485 99/293 |
| 2012/0118164 | A1* | 5/2012 | Tonelli et al. ...... | A47J 31/4485 99/293 |
| 2012/0297989 | A1* | 11/2012 | Tonelli et al. ...... | A47J 31/4485 99/293 |
| 2015/0238042 | A1* | 8/2015 | Tonelli et al. ...... | A47J 31/4489 99/323.3 |
| 2016/0000258 | A1* | 1/2016 | De'Longhi et al. ........ A47J 31/4485 99/323.1 |
| 2017/0164781 | A1* | 6/2017 | De'Longhi et al. ........ A47J 31/4485 |
| 2018/0213968 | A1* | 8/2018 | Purton ................ | A47J 31/4489 |

(Continued)

FOREIGN PATENT DOCUMENTS

| EP | 3166454 A1 | 5/2017 |
| WO | WO-9014774 A1 * | 12/1990 ........ A47J 31/4403 |
| WO | 2005102126 A2 | 11/2005 |

(Continued)

Primary Examiner — Stephen F. Gerrity
(74) Attorney, Agent, or Firm — Troutman Pepper Locke LLP

(57) ABSTRACT

A coffee machine for domestic use comprising at least two steam dispensers, of which at least one horizontal dispenser connected to a removable metal jug through a lid comprising a Venturi effect milk frother, and of which at least one vertical dispenser connected to a steam lance for performing so-called "latte art" whipping.

10 Claims, 5 Drawing Sheets

(56) References Cited

U.S. PATENT DOCUMENTS

2023/0284819 A1* 9/2023 Dionisio et al. .... A47J 31/4489

FOREIGN PATENT DOCUMENTS

| WO | 2010/044116 A2 | 4/2010 |
| WO | 2011/064702 A1 | 6/2011 |

* cited by examiner

COFFEE MACHINE

CROSS REFERENCE TO RELATED APPLICATIONS

This is a U.S. National Phase Application under 35 U.S.C. § 371 of International Patent Application No. PCT/EP2021/057888, filed Mar. 26, 2021, which claims priority of Italian Patent Application No. 102020000008128, filed Apr. 16, 2020. The entire contents of which are hereby incorporated by reference.

FIELD OF THE INVENTION

The present invention relates to an automatic coffee machine and, in particular, to a manual coffee machine for domestic use.

BACKGROUND

Coffee machines have been available on the market for some time now which enable coffee- and milk-based drinks to be obtained such as cappuccino, latte or macchiato by simply pressing a button. In these machines, the coffee is mixed with the milk which may be more or less frothy (in this application the term "milk" means any type of drink commonly known as milk whether it is of animal or vegetable origin), obtained through suction by means of the Venturi effect from a milk tank connected to a source of steam. These machines are known in the state of the art, for example, in patent applications EP3166454A1 and WO2005102126A2.

On the contrary, the milk froth is commonly obtained in professional machines by means of a vertical dispenser of the lance type, used by the operator in conjunction with a metal creamer with a circular plan. This type of preparation of milk froth, commonly known as "latte art" then enables the spout of the creamer to be used to obtain decorations on the surface of the drink.

Although there are coffee machines in the state of the art that have a steam dispensing rod in addition to an automatic device for producing milk froth (e.g. the machine described in patent application WO2011064 702A1), such machines do not enable latte art milk froth to be obtained in a professional way.

In particular, the steam lance is in a fixed position and does not allow sufficient manual dexterity in the whipping of the milk, forcing the user to perform an ineffective operation.

Furthermore, to obtain a satisfactory result, it is not possible to use the jug normally provided with the machine as it is made of plastic, which is not suitable for withstanding high temperatures and does not enable quick diffusion of heat during the whipping operation, hence causing an insufficient milk temperature and lack of foam production. To use the steam lance it is therefore necessary to be equipped with a separate metal jug, thus generating an extra cost for the user and requiring additional space for storing this extra part. Finally, the plastic jug is not generally provided with a spout to facilitate the pouring of milk into the cup, therefore creating waste and mess. A need is therefore perceived to provide a coffee machine for domestic use that enables a completely automatic operation to be performed for dispensing mixed drinks containing coffee and milk, but that also enables the preparation of "latte art" milk froth in a professional way, while still maintaining the practical characteristics typical of a home machine.

SUMMARY

The technical task of the present invention is, therefore, to provide a coffee machine for domestic use which obviates the above-described technical drawbacks of the prior art.

Within the context of this technical task, an object of the invention is to provide a coffee machine for domestic use comprising at least two steam dispensers.

This technical task, as well as these and other purposes, according to the present invention, are reached by realizing a coffee machine for domestic use comprising a machine body, at least one boiler, at least one water tank, at least one machine operating selection system, at least one steam distribution system comprising at least two steam dispensers characterized in that a first steam dispenser extends horizontally from the machine body and is connected to a removable metal jug through a lid comprising a Venturi effect milk frother; and a second steam dispenser extends vertically from the machine body and is connected to a steam lance.

Another object of the invention is that of providing a method for preparing a drink comprising coffee and milk through the coffee machine for domestic use comprising at least two steam dispensers.

This technical task, as well as these and other objects, according to the present invention are reached by providing a method for preparing a drink containing coffee and milk with the coffee machine comprising at least two steam dispensers, comprising the following steps:
  adding milk to the metal jug;
  whipping the milk through the selective dispensing of steam from the first or second steam dispenser.

Other characteristics of the present invention are further defined below.

BRIEF DESCRIPTION OF THE DRAWINGS

Further characteristics and advantages of the invention will become more apparent from the description of a preferred, but not exclusive, embodiment of the coffee machine according to the invention, which is illustrated by way of approximate and non-limiting example in the attached drawings, of which.

DETAILED DESCRIPTION

Figure 1:
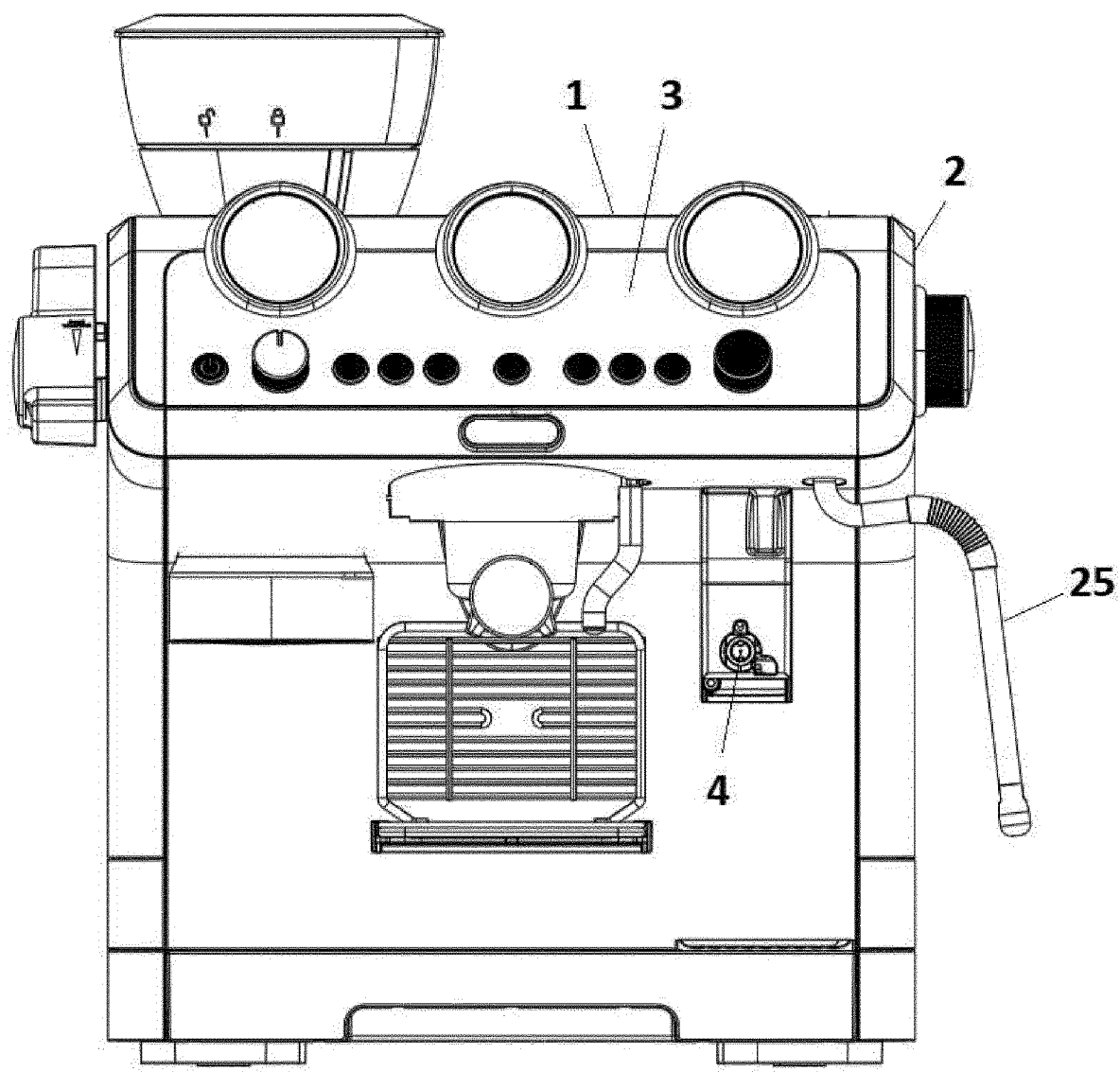
FIG. 1 shows a front view of the coffee machine with the jug and lid removed.

With reference to FIG. 1, a coffee machine is shown and indicated in its entirety by reference number 1.

The preferred application is envisaged for a manual coffee machine for domestic use, i.e. a coffee machine that envisages a filter holder cup that can be engaged and released by hand from the infuser, where the user is required to load the coffee powder into the filter holder cap before engaging the latter with the coffee machine infuser. The coffee machine 1 comprises a machine body 2, at least one boiler for producing hot water and/or steam, at least one water tank, preferably at least one coffee storage, grinding and distribution system, at least one machine operating selection system 3, at least one steam distribution system comprising at least two steam dispensers, a first horizontal dispenser 4 and a second vertical dispenser 5. Thanks to the presence of the two steam dispensers, it is possible to obtain milk froth in two ways, automatic and "latte art".

Figure 2:
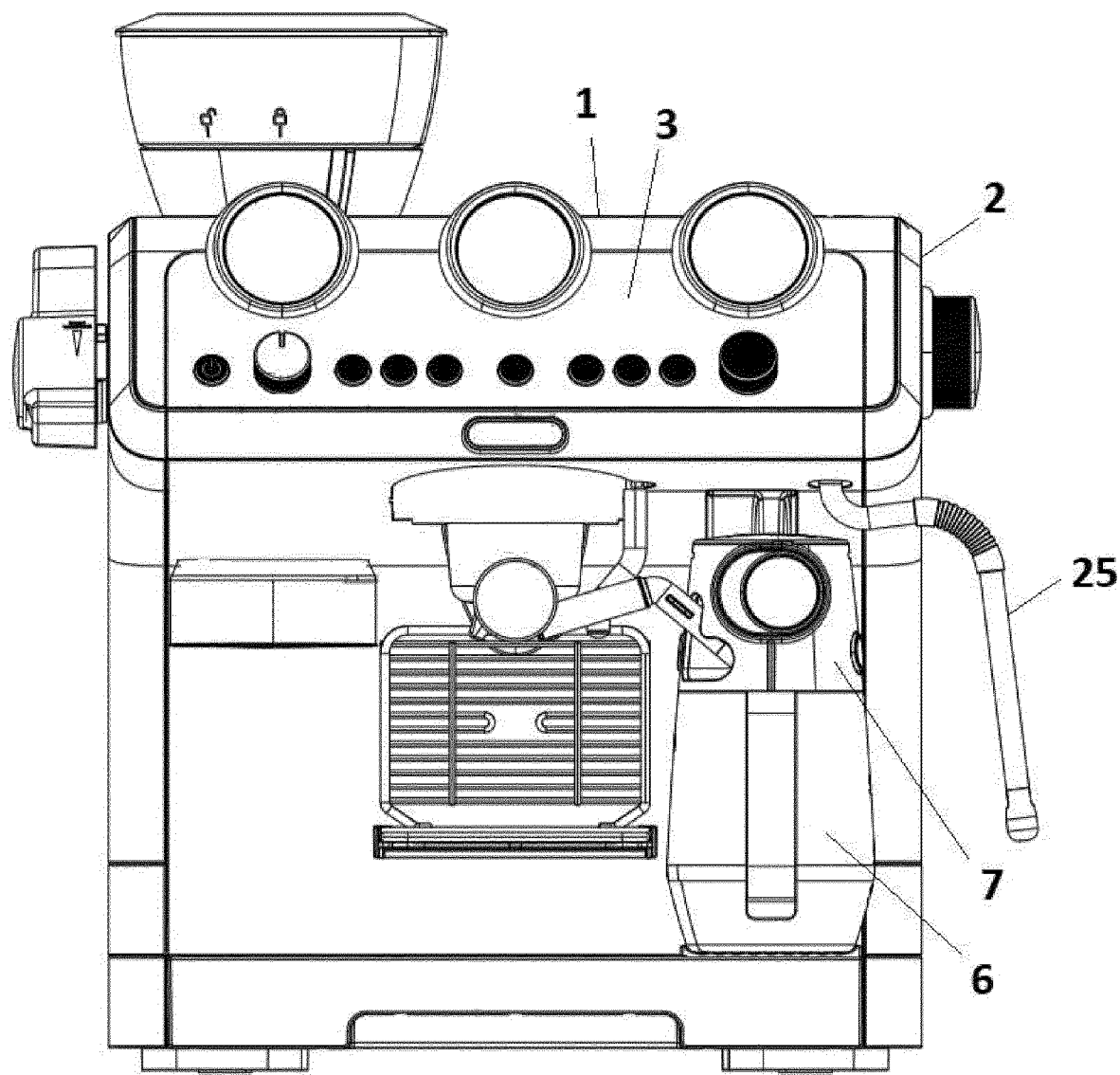
FIG. 2 shows a front view of the manual coffee machine.

In FIG. 2, the coffee machine is reproduced so as to show the metal jug 6 and the lid 7. In this position, it is possible to operate the machine completely automatically: by adding milk to the jug 6 and activating the machine through the machine operating selection system 3, the milk is whipped thanks to the Venturi system present in the lid 7 and not shown here in detail. The machine then mixes the frothed milk with the coffee. Furthermore, this can be considered as the "rest" position of the machine, in which the jug 6 and the lid 7 are placed within the dimensions of the machine, thus enabling an increase in tidiness to be obtained on the machine's resting surface, and the total space needed for operating the machine to be reduced, as it is not necessary to provide any space outside the machine for storing an extra metal jug.

Figure 3:
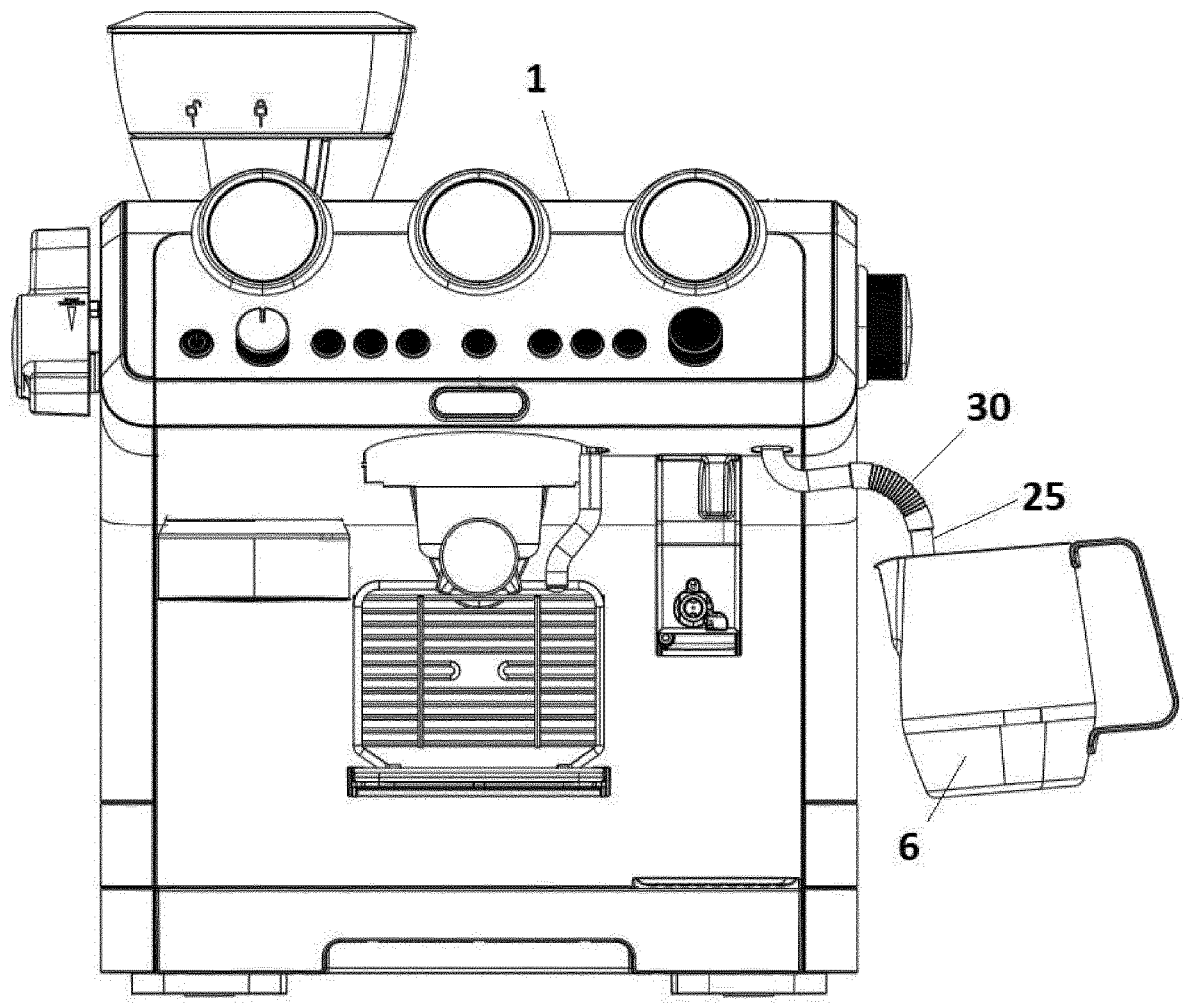
FIG. 3 shows a front view of the manual coffee machine where the jug is used for "latte art" whipping.

FIG. 3 shows the manual operating method. The jug 6 is released from the lid 7, and the whipping of the milk is performed with "latte art" thanks to a lance 25 connected to the second dispenser 5.

Figure 4:
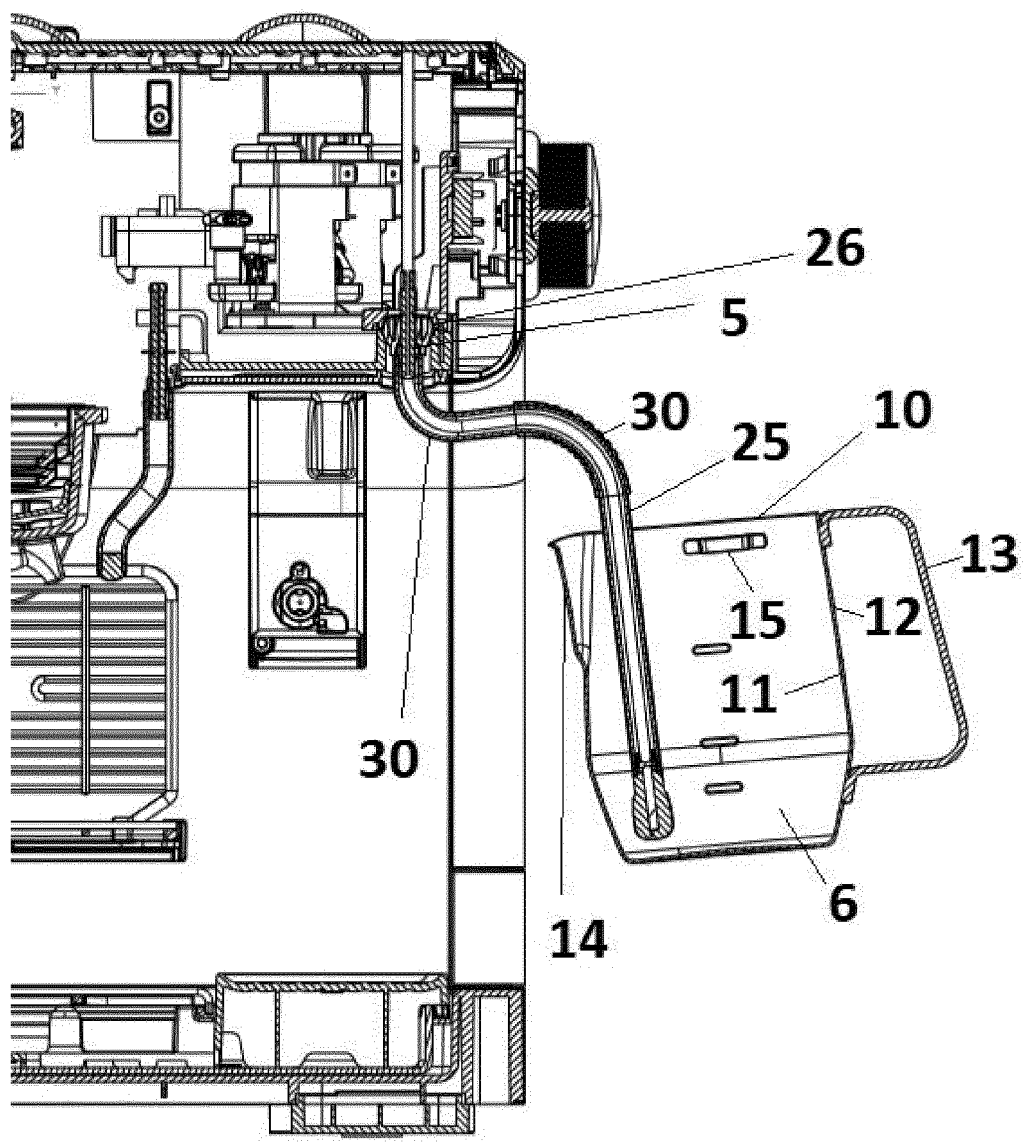
FIG. 4 shows a vertical section of the jug.

With reference also to FIG. 4, the lance 25 is connected to the second steam dispenser 5 through a swivel joint 26 which enables the lance 25 to be extracted from the shape of the machine body, so as to enable the user to whip the milk more easily, as the jug can be shaken freely in a space not occupied by the machine body.

Preferably, to move the lance 25 even further away from the machine, it is possible to equip the lance with at least one or more curves 30 particularly but not necessarily at 90° which separate rectilinear portions of the steam lance 25. To obtain simpler processing, the end of the lance 25 distal from the second steam dispenser 5 can be substantially rectilinear.

Preferably, the jug comprises stainless steel, so as to enable safe and hygienic treatment of the milk.

Preferably, the jug has a circular section, so as to enable a distribution with circular movements of the steam and, during the typical movements performed in the creation of latte art, any sprays of the contents to be prevented.

FIG. 4 shows a section of the metal jug 6. In particular, it is possible to see an upper perimeter 10 along the opening thereof, an inner surface 11, an outer surface 12, a handle 13, and a spout 14.

The metal jug can also comprise a bracket 15 useful for the snap fit connection of the jug 6 with the lid 7.

The spout enables the whipped milk to be poured with precision and typical drawings of latte art to be completed.

Figure 5:
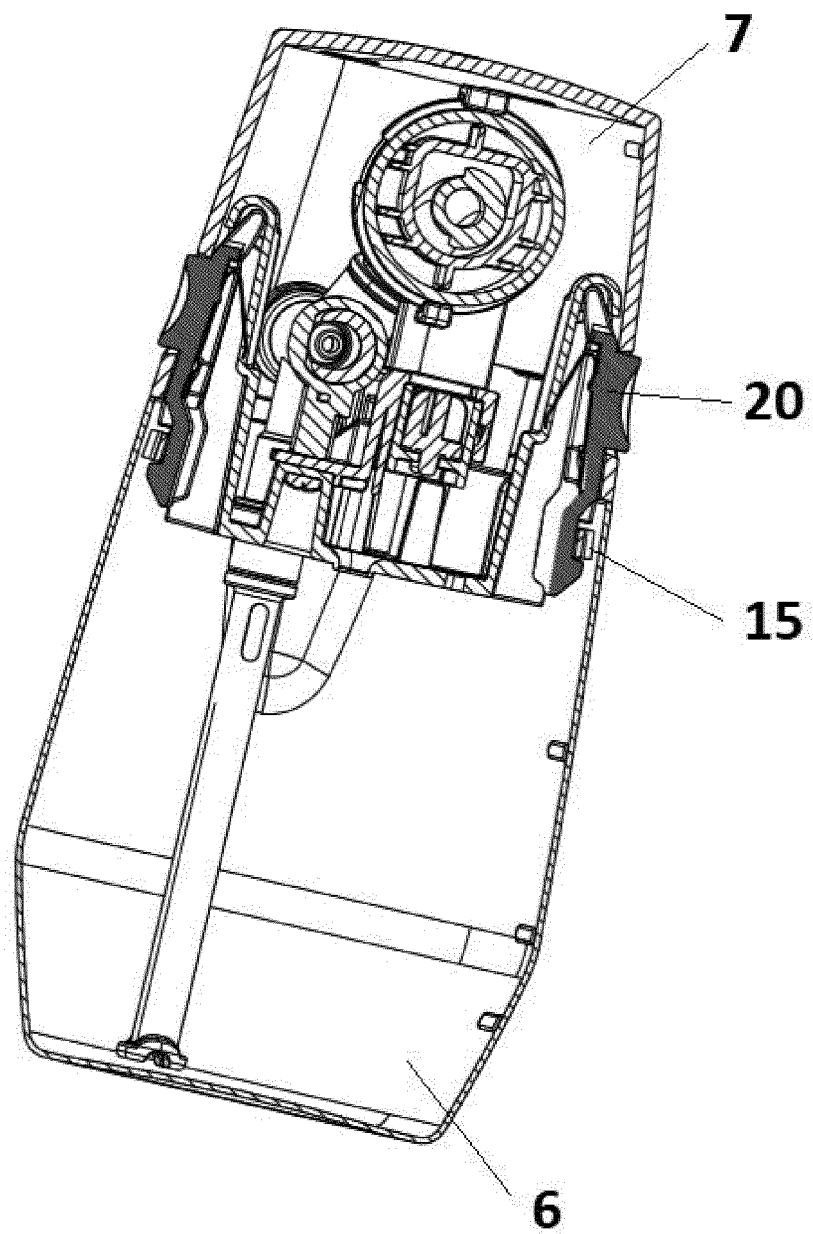
FIG. 5 shows a vertical section of the jug, the lid and the Venturi system.

In FIG. 5, the snap fit connection of the lid 7 with the jug 6 is shown in detail through a vertical section.

In particular, the bracket 15 is engaged by a lever 20 that can be integrated into the lid 7, to enable a more stable connection between the jug and the lid.

Preferably, the lid is shaped so as to adapt to the upper perimeter 10 of the metal jug, in order to obtain a substantially hermetic closure of the jug and thus prevent the exit of steam or liquid during the operation.

Furthermore, the closure of the jug by means of the lid enables the contents of the jug to be protected from external agents, e.g. during storage in the fridge.

The operation of the coffee machine according to the invention appears clear from the description and illustration and, in particular, is substantially as follows.

In the preparation method using the coffee machine of the present invention, it is possible to identify three successive steps, in particular:
    adding milk to the metal jug;
    whipping the milk through the dispensing of steam;
    mixing milk and coffee.

The second step can be performed both through automatic mode, when the jug is connected to the machine through the lid and the steam dispensing takes place by means of the horizontal dispenser, or in manual mode when the jug is released from the lid and the vertical dispenser is used to whip the milk.

In practice, it has been noted how the coffee machine according to the invention is particularly advantageous for being able to obtain good quality mixed drinks containing milk and coffee and with a professional appearance, without sacrificing the characteristics of practicality, simplicity of use and compactness typical of a coffee machine for domestic use.

In particular, the metal jug is configured for the correct execution of milk frothing both automatically and manually.

The jug is therefore made of metal material, for example steel, both to resist thermal changes, since the milk quickly passes from a low fridge temperature (e.g. 4° C.) to a high temperature during frothing (e.g. 70° C.), and to slow down the heating process if the jug has been previously kept in the fridge.

The truncated-cone geometry of the metal jug at the same time guarantees the incorporation of the steam and the amalgamation of the milk froth thanks to the vortex effect, the handle guarantees a firm grip, and the spout guarantees the correct pouring of the milk cream for preparing cappuccino.

The coffee machine as conceived herein is susceptible to many modifications and variations, all falling within the scope of the inventive concept defined in the claims; furthermore, all the details are replaceable by technically equivalent elements. In practice, the materials used, as well as the dimensions, can be any according to the needs and the state of the art.

The invention claimed is:

1. A coffee machine for domestic use comprising:
    a machine body, a boiler, a water tank, a machine operating selection system, and a steam distribution system comprising at least two steam dispensers comprising:
        a first steam dispenser extending horizontally from the machine body and is connected to a removable metal jug through a lid comprising a Venturi effect milk frother; and
        a second steam dispenser extending vertically from the machine body and is connected to a steam lance,
        wherein the metal jug comprises an upper perimeter along the opening thereof, an inner surface, an outer surface, a handle, and a spout, wherein the metal jug comprises at least one bracket arranged on the inner surface of the jug.

2. The coffee machine according to claim 1, wherein the lid is shaped so as to adapt to the upper perimeter of the metal jug.

3. The coffee machine according to claim 1, wherein the lid comprises at least one connection lever which engages the at least one bracket arranged inside the jug.

4. The coffee machine according to claim 1, wherein the metal jug comprises stainless steel.

5. The coffee machine according to claim 1, wherein the metal jug has a substantially circular section.

6. The coffee machine according to claim 1; wherein said lance is connected to said second dispenser by a swivel joint.

7. The coffee machine according to claim 1, wherein said lance has a steam dispensing position in which it is extracted from the shape of the machine body.

8. The coffee machine according to claim 1, wherein the lance comprises at least one curve.

9. A method for preparing a drink containing coffee and milk with the machine according to claim 1, comprising the following steps:
  adding milk to the metal jug; and
  whipping the milk through the selective dispensing of steam from the first or second dispenser.

10. The method according to claim 9, wherein the step of whipping the milk through the first dispenser is performed automatically in the metal jug connected to the machine by the lid, whereas the step of whipping the milk through the second dispenser is performed manually in the metal jug.

\* \* \* \* \*